United States Patent
Majagi et al.

(10) Patent No.: US 9,847,520 B1
(45) Date of Patent: Dec. 19, 2017

(54) THERMAL PROCESSING OF INTERCONNECTS

(71) Applicant: Bloom Energy Corporation, Sunnyvale, CA (US)

(72) Inventors: Shivanand Majagi, Rogers, AK (US); Harald Herchen, Los Altos, CA (US); Sanjiv Kapoor, Sunnyvale, CA (US); Michael Gasda, Mountain View, CA (US); Chung-Dee Pong, Sunnyvale, CA (US); Avinash Verma, Cupertino, CA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 791 days.

(21) Appl. No.: 13/939,814

(22) Filed: Jul. 11, 2013

Related U.S. Application Data

(60) Provisional application No. 61/673,548, filed on Jul. 19, 2012.

(51) Int. Cl.
  *C22F 1/11* (2006.01)
  *H01M 2/14* (2006.01)
  *H01M 2/20* (2006.01)

(52) U.S. Cl.
  CPC .............. *H01M 2/202* (2013.01); *C22F 1/11* (2013.01); *H01M 2/208* (2013.01)

(58) Field of Classification Search
  CPC .................................. C22F 1/11; H01M 2/202
  USPC .......................................................... 432/261
  See application file for complete search history.

(56) References Cited

U.S. PATENT DOCUMENTS

| | | |
|---|---|---|
| 4,135,041 A | 1/1979 | Jung et al. |
| 4,755,429 A | 7/1988 | Nickols et al. |
| 4,913,982 A | 4/1990 | Kotchick et al. |
| 5,162,167 A | 11/1992 | Minh et al. |
| 5,213,910 A | 5/1993 | Yamada |
| 5,215,946 A | 6/1993 | Minh |
| 5,248,712 A | 9/1993 | Takeuchi et al. |
| 5,256,499 A | 10/1993 | Minh et al. |
| 5,273,837 A | 12/1993 | Aitken et al. |
| 5,290,642 A | 3/1994 | Minh et al. |
| 5,342,705 A | 8/1994 | Minh et al. |
| 5,368,667 A | 11/1994 | Minh et al. |
| 5,382,315 A | 1/1995 | Kumar |

(Continued)

FOREIGN PATENT DOCUMENTS

| | | |
|---|---|---|
| EP | 0615299 A1 | 9/1994 |
| EP | 1098380 A1 | 5/2001 |

(Continued)

OTHER PUBLICATIONS

Nisbett, Edward G.. (2005). Steel Forgings: Design, Production, Selection, Testing and Application:(MNL 53)—9.4.1.3 Vertical Furnaces. ASTM International.*

(Continued)

*Primary Examiner* — Colleen Dunn
*Assistant Examiner* — Jeremy Jones
(74) *Attorney, Agent, or Firm* — The Marbury Law Group PLLC

(57) ABSTRACT

Various embodiments include methods of fabricating an interconnect for a fuel cell stack. Methods for controlled pre-oxidation of an interconnect include oxidizing in a nitride-inhibiting environment to inhibit the formation of nitrides.

18 Claims, 12 Drawing Sheets

(56) References Cited

U.S. PATENT DOCUMENTS

| | | | |
|---|---|---|---|
| 5,453,331 A | 9/1995 | Bloom et al. | |
| 5,476,248 A | 12/1995 | Kobayashi et al. | |
| 5,494,700 A | 2/1996 | Anderson et al. | |
| 5,501,914 A | 3/1996 | Satake et al. | |
| 5,518,829 A | 5/1996 | Satake et al. | |
| 5,589,017 A | 12/1996 | Minh | |
| 5,641,585 A | 6/1997 | Lessing et al. | |
| 5,733,499 A | 3/1998 | Takeuchi et al. | |
| 5,942,349 A * | 8/1999 | Badwal | H01M 8/0208 427/115 |
| 5,955,392 A | 9/1999 | Takeuchi et al. | |
| 6,001,761 A | 12/1999 | Hata et al. | |
| 6,361,892 B1 | 3/2002 | Ruhl et al. | |
| 6,461,156 B2 * | 10/2002 | Kumazawa | F27D 1/0006 432/258 |
| 6,492,053 B1 | 12/2002 | Donelson et al. | |
| 6,582,845 B2 | 6/2003 | Helfinstine et al. | |
| 6,589,681 B1 | 7/2003 | Yamanis | |
| 6,638,575 B1 | 10/2003 | Chen et al. | |
| 6,835,488 B2 | 12/2004 | Sasahara et al. | |
| 7,045,237 B2 | 5/2006 | Sridhar et al. | |
| 7,247,403 B2 * | 7/2007 | Brady | C23C 8/26 148/230 |
| 7,981,561 B2 * | 7/2011 | Rakowski | C25F 3/24 429/457 |
| 8,173,063 B2 | 5/2012 | Zobl et al. | |
| 8,852,825 B2 | 10/2014 | Batawi et al. | |
| 8,962,219 B2 | 2/2015 | Couse et al. | |
| 2002/0012825 A1 | 1/2002 | Sasahara et al. | |
| 2002/0132156 A1 | 9/2002 | Ruhl et al. | |
| 2003/0170527 A1 | 9/2003 | Finn et al. | |
| 2003/0180602 A1 | 9/2003 | Finn | |
| 2004/0101742 A1 | 5/2004 | Simpkins et al. | |
| 2004/0200187 A1 | 10/2004 | Warrier et al. | |
| 2004/0250923 A1 * | 12/2004 | Itagaki | C21D 6/002 148/325 |
| 2005/0017055 A1 | 1/2005 | Kurz et al. | |
| 2005/0084725 A1 | 4/2005 | Arthur et al. | |
| 2005/0136312 A1 | 6/2005 | Bourgeois et al. | |
| 2005/0227134 A1 | 10/2005 | Nguyen | |
| 2006/0192323 A1 | 8/2006 | Zobl et al. | |
| 2006/0251947 A1 | 11/2006 | Carter et al. | |
| 2007/0134532 A1 | 6/2007 | Jacobson et al. | |
| 2007/0151415 A1 | 7/2007 | Chun et al. | |
| 2007/0207375 A1 | 9/2007 | Jacobson et al. | |
| 2007/0231676 A1 | 10/2007 | Cassidy et al. | |
| 2008/0013257 A1 | 1/2008 | Seitz et al. | |
| 2008/0081223 A1 | 4/2008 | Yasumoto et al. | |
| 2008/0199738 A1 | 8/2008 | Perry et al. | |
| 2008/0236710 A1 * | 10/2008 | Rakowski | C21D 1/74 148/606 |
| 2009/0004547 A1 | 1/2009 | Vitella et al. | |
| 2009/0104494 A1 * | 4/2009 | Quadakkers | C22C 38/005 429/488 |
| 2009/0117441 A1 | 5/2009 | Suzuki et al. | |
| 2009/0162236 A1 | 6/2009 | Hammond et al. | |
| 2009/0220833 A1 | 9/2009 | Jones | |
| 2009/0246636 A1 | 10/2009 | Chiang et al. | |
| 2010/0119917 A1 | 5/2010 | Kumar et al. | |
| 2010/0233576 A1 | 9/2010 | Brandner et al. | |
| 2010/0234200 A1 | 9/2010 | Kurisu | |
| 2010/0239937 A1 | 9/2010 | Janousek et al. | |
| 2011/0135531 A1 | 6/2011 | Hsu et al. | |
| 2011/0143261 A1 | 6/2011 | Brandner et al. | |
| 2011/0223510 A1 | 9/2011 | Greiner et al. | |
| 2011/0287340 A1 | 11/2011 | Mougin et al. | |
| 2013/0129557 A1 | 5/2013 | Herchen et al. | |
| 2013/0130154 A1 | 5/2013 | Darga et al. | |

FOREIGN PATENT DOCUMENTS

| | | |
|---|---|---|
| JP | 06-215778 | 8/1994 |
| JP | 09-199143 | 7/1997 |
| JP | 09-223506 | 8/1997 |
| JP | 09-245811 | 9/1997 |
| JP | O9-245810 | 9/1997 |
| JP | 09-277226 | 10/1997 |
| JP | 2000-281438 | 10/2000 |
| JP | 2010-113955 A | 5/2010 |
| WO | WO2006/016628 A1 | 2/2006 |

OTHER PUBLICATIONS

R.Y. Chen and W.Y.D. Yuen, 8—Oxide scales on hot-rolled steel strips, In Woodhead Publishing Series in Metals and Surface Engineering, edited by Wei Gao and Zhengwei Li, Woodhead Publishing, 2008, pp. 192-252, Developments in High Temperature Corrosion and Protection of Materials.*

Jeffrey W. Fergus, Metallic interconnects for solid oxide fuel cells, Materials Science and Engineering: A, vol. 397, Issues 1-2, Apr. 25, 2005, pp. 271-283, ISSN 0921-5093.*

Haynes International High-Temperature Alloys, "HAYNES (Reg.) 214 (TM) alloy", 1996, pp. 1-19.

Haynes International High-Temperature Alloys, "HAYNES (Reg.) 230(TM) alloy", 2004, pp. 1-27.

International Search Report & Written Opinion, International Application No. PCT/US2007/08224, dated Nov. 26, 2008, 10 pgs.

International Search Report, International Application No. PCT/US2003/04808, dated Aug. 19, 2003, 9pgs.

Supplementary European Search Report, International Application No. PCT/US2003/04808, dated Jun. 2, 2008, 3pgs.

International Search Report & Written Opinion, International Application No. PCT/US2010/027899, dated Oct. 20, 2010, 11pgs.

International Preliminary Report on Patentability, International Application No. PCT/US2010/027899, dated Sep. 20, 2011, 6pgs.

"Powder Metallurgy Design Manual," 3rd Edition, copyright Metal Powder Industries Federation, 1998.

International Preliminary Report on Patentability, Application No. PCT/US2012/065508, dated May 30, 2014.

International Preliminary Report on Patentability, Application No. PCT/US2012/065531, dated May 30, 2014.

International Preliminary Report on Patentability, Application No. PCT/US2012/065508, dated Mar. 29, 2013, 13 pages.

U.S. Appl. No. 13/781,206, filed Feb. 28, 2013.

U.S. Appl. No. 14/543,095, filed Nov. 17, 2014.

* cited by examiner

THERMAL PROCESSING OF INTERCONNECTS

The present application claims benefit of U.S. Provisional Patent Application Ser. No. 61/673,548 filed on Jul. 19, 2012, which is incorporated herein by reference in its entirety.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In order to optimize the operation of SOFCs, the oxidizing and fuel flows should be precisely regulated. Therefore, the flow regulating structures, such as interconnects in the fuel cell system should be precisely manufactured.

SUMMARY

Embodiments include methods for fabricating an interconnect for a fuel cell stack which comprise providing a compressed powder metal interconnect containing an organic binder in a sub-atmospheric environment of a processing gas comprising hydrogen, an inert gas, or a mixture of hydrogen and an inert gas; and subjecting the compressed powder metal interconnect to a debinding treatment at a first elevated temperature in the sub-atmospheric environment of the processing gas for a period sufficient to remove the organic binder from the interconnect. In embodiments, the method may further include subjecting the compressed powder metal interconnect to a sintering treatment at a second elevated temperature in a sub-atmospheric environment of a processing gas comprising hydrogen, an inert gas, or a mixture of hydrogen and an inert gas for a period sufficient to result in a uniform interdiffusion of metals in the interconnect.

Further embodiments include methods of sintering an interconnect for a fuel cell stack that comprise providing a compressed powder metal interconnect; increasing the temperature of the interconnect at a first temperature ramp rate to a first elevated temperature; maintaining the interconnect at the first elevated temperature for a first hold time; increasing the temperature of the interconnect at a second temperature ramp rate, where the second temperature ramp rate is less than the first temperature ramp rate; and maintaining the interconnect at a peak sintering temperature for a period sufficient to complete the sintering of the interconnect. In embodiments, the temperature of the interconnect may be increased at the second ramp rate to a second elevated temperature, and the method may further include maintaining the interconnect at the second elevated temperature for a second hold time; and increasing the temperature of the interconnect at a third temperature ramp rate to a third elevated temperature, which may be the peak sintering temperature, where the third temperature ramp rate is less than the first temperature ramp rate and the second temperature ramp rate.

Further embodiments include methods of oxidizing an interconnect for a fuel cell stack that comprise subjecting the interconnect to an initial oxidation treatment at an elevated temperature in a nitride-inhibiting environment to form a thin oxide layer on at least a surface of the interconnect. In some embodiments, the method may further include subjecting the interconnect to a secondary oxidation treatment at an elevated temperature to substantially fill exposed pores of the interconnect with an oxide material. In some embodiments, the method may further include continuing to oxidize the interconnect in the nitride-inhibiting environment to substantially fill exposed pores of the interconnect with an oxide material.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Various embodiments include methods of manufacturing interconnects for a fuel cell stack, as well as interconnects and fuel cell stacks manufactured using the various embodiment methods.

Figure 1:
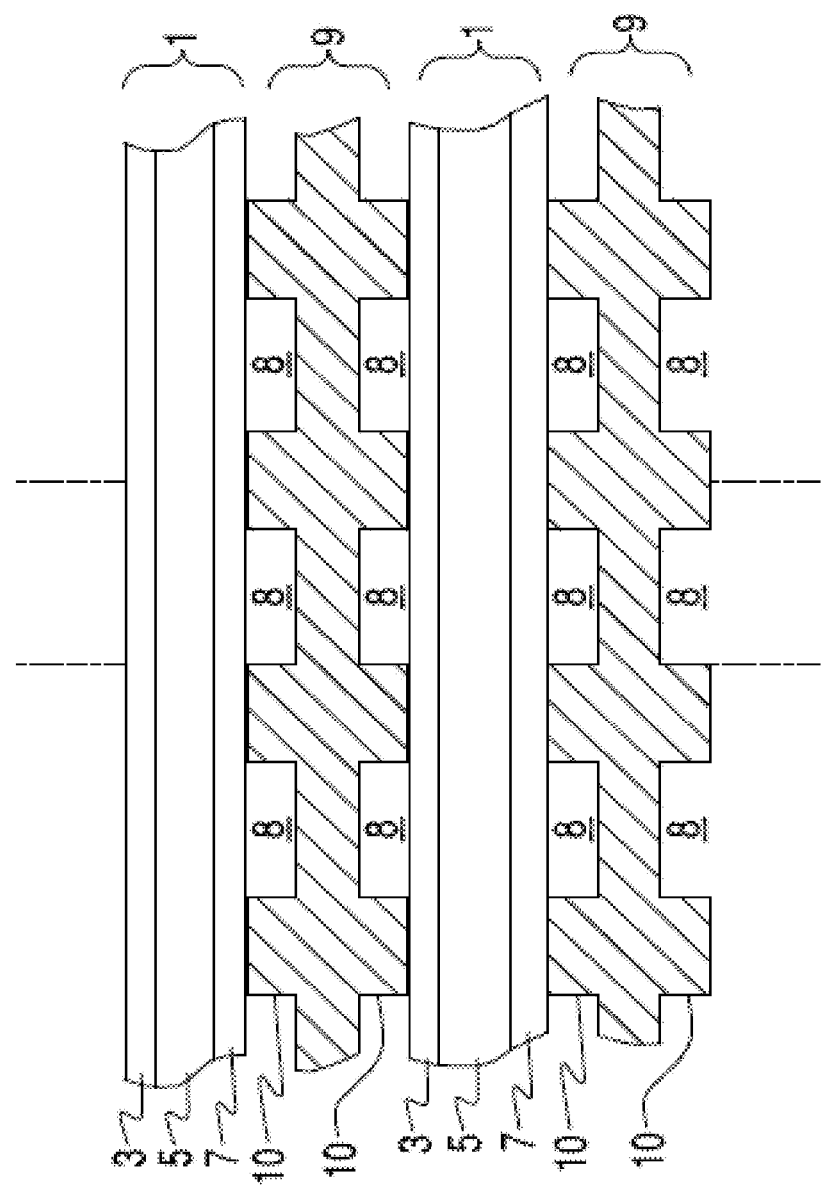
FIG. 1 illustrates a side cross-sectional view of a SOFC stack.

An example of a solid oxide fuel cell (SOFC) stack is illustrated in FIG. 1. Each SOFC 1 comprises a cathode electrode 7, a solid oxide electrolyte 5, and an anode electrode 3. Fuel cell stacks are frequently built from a multiplicity of SOFC's 1 in the form of planar elements, tubes, or other geometries. Fuel and air has to be provided to the electrochemically active surface, which can be large.

The gas flow separator 9 (referred to as a gas flow separator plate when part of a planar stack), containing gas flow passages or channels 8 between ribs 10, separates the individual cells in the stack. Frequently, the gas flow separator plate 9 is also used as an interconnect which electrically connects the anode or fuel electrode 3 of one cell to the cathode or air electrode 7 of the adjacent cell. In this case, the gas flow separator plate which functions as an interconnect is made of or contains electrically conductive material. The interconnect/gas flow separator 9 separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. At either end of the stack, there may be an air end plate or fuel end plate (not shown) for providing air or fuel, respectively, to the end electrode. An "interconnect" as used herein refers to both a interconnect/gas flow separator between two adjacent fuel cells in a fuel cell stack as well as to an "end plate" located at an end of a fuel cell stack, unless otherwise specified. FIG. 1 shows that the lower SOFC 1 is located between two interconnects 9.

For solid oxide fuel cell stacks, the interconnect 9 is typically made from an electrically conductive metal material, and may comprise a chromium alloy, such as a Cr—Fe alloy made by a powder metallurgy technique. The powder metallurgy technique may include pressing and sintering a Cr—Fe powder, which may be a mixture of Cr and Fe powders and/or pre-alloyed Cr—Fe powder, to form a Cr—Fe alloy interconnect in a desired size and shape (e.g., a "net shape" or "near net shape" process). A typical chromium-alloy interconnect may comprise at least about 80% chromium, and preferably more than about 90% chromium, such as about 95% chromium. The interconnect may contain less than about 20% iron, and preferably less than about 10% iron, such as about 4-5% iron. The interconnect may contain less than about 2%, such as about zero to 1% of other materials, such as yttrium or yttria, as well as residual or unavoidable impurities.

In one comparative example method for fabricating interconnects, blended Cr and Fe elemental powders are pressed in a hydraulic or mechanical press to produce a part having the desired interconnect shape. The Cr and Fe powders are blended with an organic binder and pressed into so-called "green parts" using a conventional powder metallurgy technique. The "green parts" have substantially the same size and shape as the finished interconnect (i.e., "near net shape"). The organic binder in the green parts is removed before the parts are sintered. The organic binder is removed in a debinding process in a continuous furnace that is operated at atmospheric pressure at a temperature of 400° C. to 800° C. under flow of hydrogen gas. After debinding, the compressed powder Cr—Fe interconnects are sintered at high-temperature to promote interdiffusion of the Cr and Fe.

Figure 2:
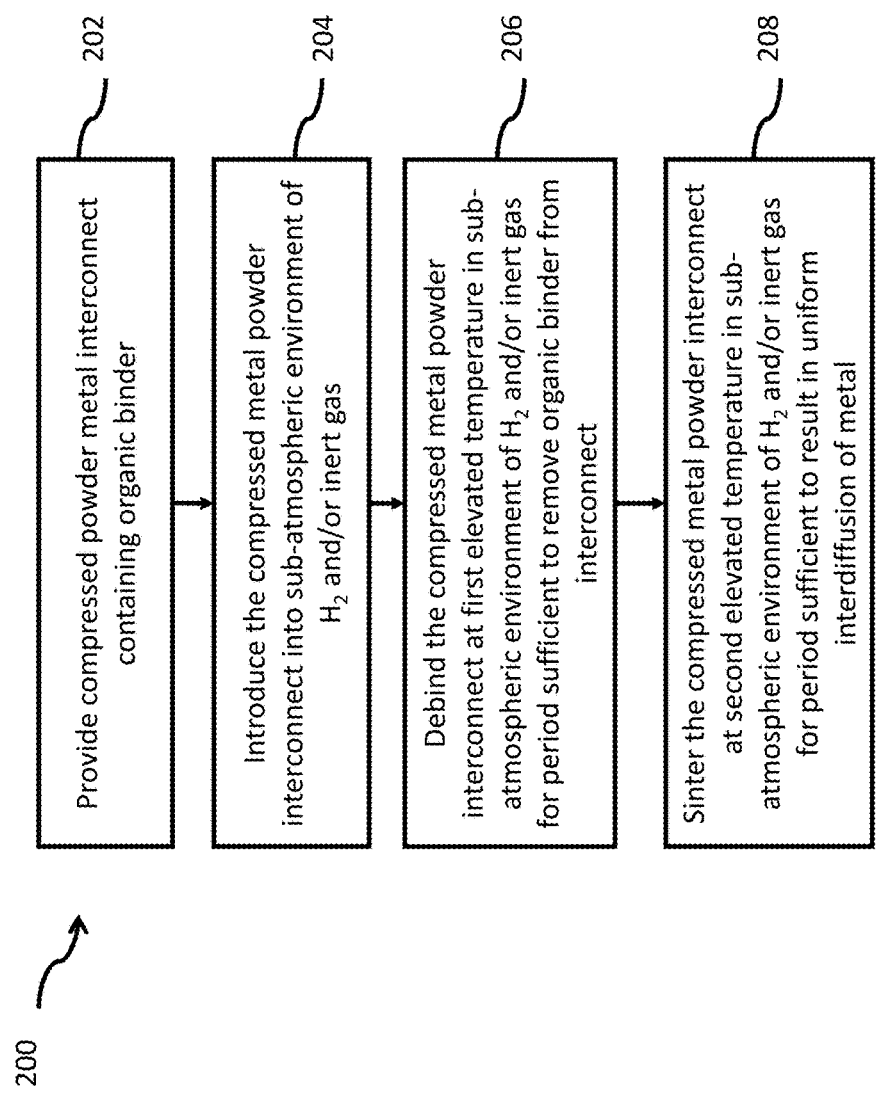
FIG. 2 is a process flow diagram illustrating an embodiment method for fabricating an interconnect for a fuel cell stack.

FIG. 2 is a process flow diagram illustrating a method 200 for fabricating an interconnect for a fuel cell stack in accordance with one embodiment of the present invention. The method 200 includes providing a compressed powder metal interconnect containing an organic binder at step 202. The compressed powder metal interconnect can be a "green part" produced by a powder metallurgy technique, such as described above. The compressed powder metal interconnect may be a "pre-sintered" interconnect, meaning that the interconnect has not yet been subjected to a heat treatment step to promote the interdiffusion of constituent metals, such as Cr and Fe, in the compressed powder.

In a preferred embodiment, a plurality of pre-sintered interconnects are provided in step 202. The plurality of interconnects may be vertically stacked, interleaved with one or more spacers, such as ceramic tiles, to form an interconnect column. One or more interconnect columns may be placed in a container (e.g., a "retort"), which may be a container made of graphite or another high-temperature material that is adapted to contain vapors from the processed interconnects and prevent contamination of a processing chamber (e.g., a vacuum furnace) and any heating elements associated with the processing chamber. The container may include an interior (e.g., bottom) surface of molybdenum or another high-temperature material which does not contaminate the interconnects, and the interconnect column may be positioned in contact with this interior surface. In embodiments, the container may be a graphite container that is lined with one or more molybdenum sheets so that the interconnects and spacers do not make direct contact with the graphite container.

Figure 3A:
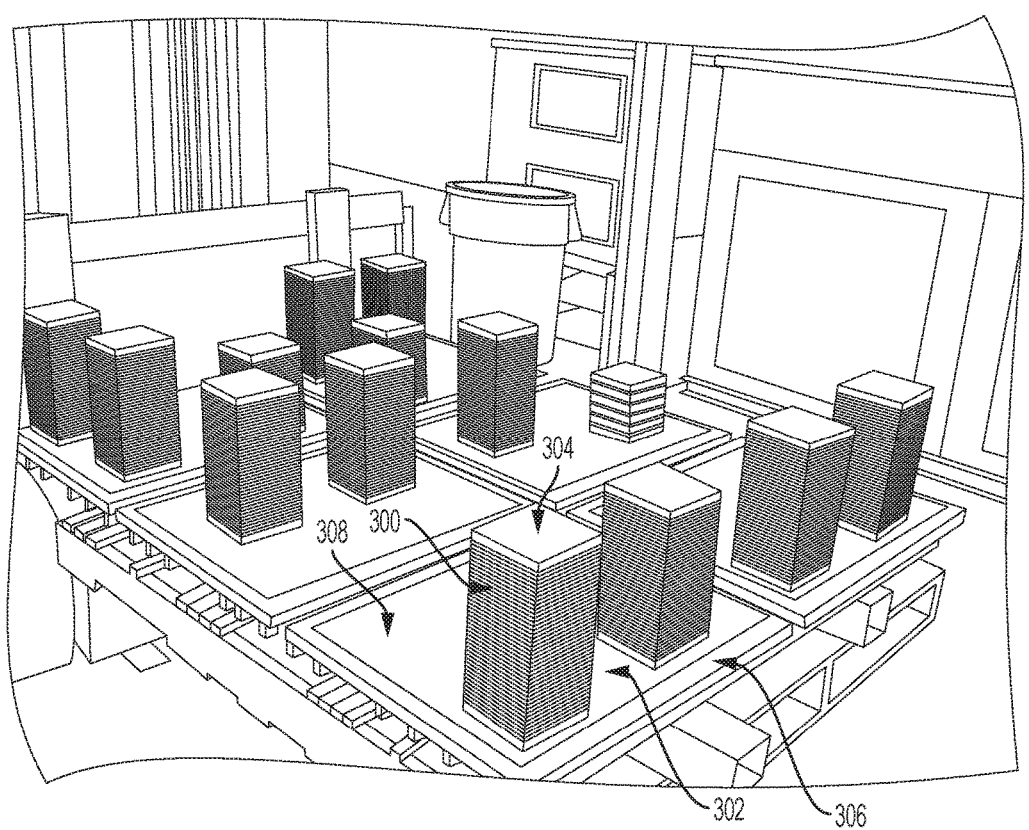
FIGS. 3A and 3B illustrate columns of interconnects positioned within a container for processing in a vacuum furnace.
Figure 3B:
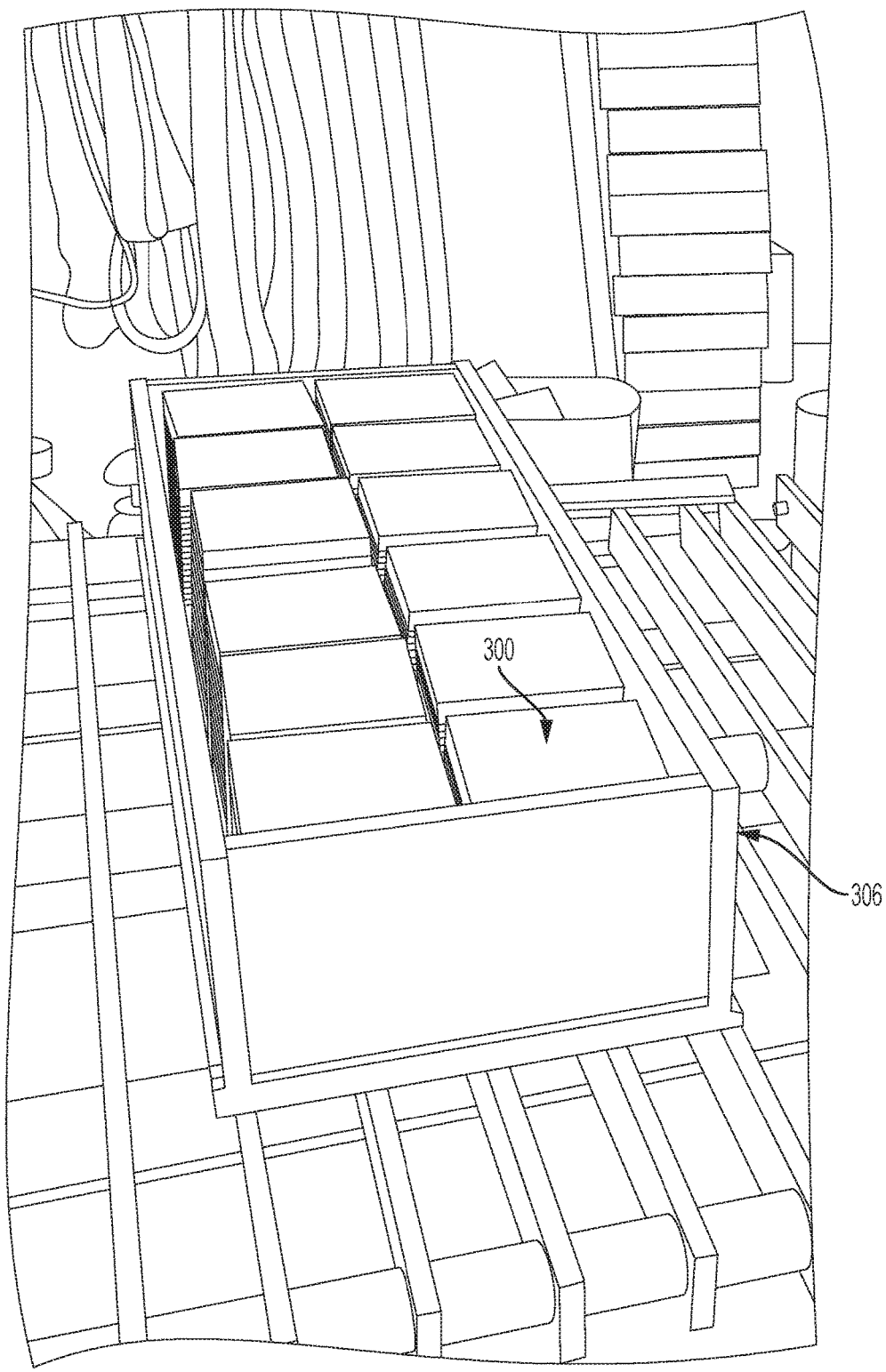

FIG. 3A illustrates an example of a plurality of interconnect columns 300. Each column 300 includes a plurality of interconnects 302 interleaved with ceramic tiles 304. A ceramic tile 304 is shown positioned on the top of the column 300. The columns 300 are placed on a molybdenum sheet 308, which lines the interior of the bottom surface of a graphite container 306. FIG. 3B illustrates the columns 300 arranged within a partially assembled graphite container 306. The graphite container 306 also includes a lid (not shown) that may be positioned over the top of the container to enclose the interconnect columns 300 within the container.

The ratio of ceramic tiles to interconnects in a column may be optimized to maximize throughput and minimize warping ("camber") of the interconnects. In various embodiments, a column of interconnects includes at least 2 interconnects, and may be greater than 3, greater than 5, greater than 10, greater than 15, or greater than 20 interconnects. In some embodiments, the ratio of interconnects to spacers may be approximately 1:1. In other embodiments, the ratio of interconnects to ceramic tiles may be greater than 1:1, such as greater than about 2:1, greater than about 3:1, greater than about 5:1, greater than about 10:1, greater than about 25:1, etc. For example, two or more interconnects in the column may contact one or both adjacent interconnects in the column without having the spacer tile located between them. For example, five or more interconnects, such as 7-25 interconnects may be placed in contact with each other in the column without the spacer tile(s) being located between them. In some embodiments, adjacent interconnects in a column may be rotated by an angle (e.g., 90 degrees) with respect to each another (e.g. with ribs 10 extending in non-parallel directions in adjacent interconnects) to avoid warping during high-temperature processing steps, such as debinding or sintering.

In step 204 of method 200 shown in FIG. 2, the compressed metal powder interconnect is introduced into a reduced atmosphere environment of $H_2$ and/or inert gas. In embodiments, this may include introducing one or more interconnects into a processing chamber, which in preferred embodiments comprises a vacuum furnace. In a preferred embodiment, a container containing one or more columns of interconnects, such as graphite container 300 shown in FIGS. 3A-B, is introduced into the processing chamber. In other embodiments, the interconnects can be loaded into the processing chamber in another manner, such as by hanging the interconnects in the processing chamber.

The processing chamber, such as a vacuum furnace, may be configured to provide a reduced- or sub-atmosphere environment (i.e., below 1 atm, or 760 Torr, pressure). In one embodiment, one or more compressed powder metal interconnects may be introduced into the processing chamber, and processing chamber may be evacuated to a pressure of approximately $1 \times 10^{-3}$ Torr or less (e.g., $10^{-3}$ to $10^{-6}$). One or more pump-purge cycles may be used to further remove any trace gasses from the processing chamber. In one embodiment of a pump-purge cycle, the chamber is partially filled with an inert gas, such as Ar, up to approximately 10 Torr, and then the chamber is evacuated down to a pressure of approximately $1 \times 10^{-3}$ Torr or less. The processing chamber may then be filled with a desired reduced atmosphere environment for processing of interconnects. A typical sub-atmospheric environment in the various embodiments is between approximately 100 and 700 Torr, and may be, for example, less than approximately 750 Torr, less than approximately 600 Torr, 500 Torr, 400 Torr, 300 Torr, 200 Torr, or in some embodiments, less than approximately 100 Torr (e.g., 50-200 Torr). In embodiments, the reduced atmosphere environment within the processing chamber is composed substantially or entirely of dry hydrogen gas, a dry inert gas, such as argon, helium, neon, etc., or a mixture of hydrogen gas and one or more inert gases (e.g., argon). In various embodiments, the processing chamber includes at least about 75%, or at least about 80%, or at least about 90%, or at least about 95%, or at least about 98%, or more than 99% (e.g., 90-99.9%) of hydrogen gas, an inert gas such as argon, or a mixture of hydrogen gas and one or more inert gases. In embodiments, the reduced atmosphere environment can be at least substantially free of nitrogen and/or oxygen (i.e., no intentionally added $N_2$ or $O_2$).

In step 206 of embodiment method 200, the compressed metal powder interconnect is debinded by subjecting the interconnect to an elevated temperature in a sub-atmospheric environment of hydrogen gas, an inert gas, such as argon, helium, neon, etc., or a mixture of hydrogen gas and one or more inert gases, for a period sufficient to remove substantially all the organic binder from the part. In one embodiment, one or more compressed powder metal interconnects may be provided in a processing chamber having a reduced atmosphere environment of hydrogen, an inert gas, or a mixture of hydrogen and an inert gas, as described above, and the debinding step 206 comprises increasing the temperature within the chamber to an elevated temperature of between approximately 400° C.-800° C. The processing chamber may be, for example, a vacuum furnace, and may be operable to control the conditions within the chamber, including at least the pressure, gas composition and temperature within the processing chamber. In a preferred embodiment, the reduced atmosphere environment is comprised substantially entirely of hydrogen gas during the debinding step 206. In other embodiments, the enviroment may be or may include an inert gas, such as argon. In one embodiment, the pressure within the processing chamber may be maintained at approximately 100 Torr at 50 standard cubic feet per hour (SCFH). In one embodiment, the debinding time at highest temperature is between 3 and 6 hours, such as approximately 4 hours.

In step 208 of embodiment method 200, the compressed metal powder interconnect is sintered by subjecting the interconnect to an elevated temperature in a reduced atmosphere environment of hydrogen gas, an inert gas, such as argon, helium, neon, etc., or a mixture of hydrogen gas and one or more inert gases, for a period sufficient to result in a substantially uniform interdiffusion of metals in the interconnect. In one embodiment, one or more compressed powder metal interconnects may be provided in a processing chamber having a reduced atmosphere environment of hydrogen, an inert gas, or a mixture of hydrogen and an inert gas, as described above, and the sintering step 208 comprises controlling the temperature within the chamber to provide an elevated temperature (e.g., 1300° C.-1550° C., such as about 1400° C. for 5-10 hours) sufficient for sintering of the interconnects. The sintering step 208 may be performed in the same processing chamber (e.g., vacuum furnace) as the debinding step 206. In embodiments, the processing chamber may be evacuated between the debinding 206 and sintering 208, and the reduced atmosphere gas environment used during debinding 206 may be replaced with a different reduced atmosphere gas environment for the sintering step 208. For example, where the debinding 206 is performed in a hydrogen gas environment, the process chamber may be evacuated and replaced with a different reduced atmosphere environment, such as an argon or other inert gas environment. In some embodiments, the same reduced atmosphere gas environment may be used for both the debinding 206 and sintering 208 steps.

In some embodiments, the debinding step 206 may be performed in a substantially nitrogen-free environment. The carbon in the organic binder (e.g., wax) may react with nitrogen to form carbon-nitrides when the interconnects are debinded. These carbon-nitrides may be reintroduced into the interconnects, either during the debinding step 206 or, in particular, during the higher-temperature sintering step 208, and may form chromium-carbon-nitrides in the interconnect, which is undesirable. This may be avoided by debinding the interconnects in a substantially nitrogen-free environment. In some embodiments, the reintroduction of carbon-nitrides may be avoided by debinding the interconnects in a different furnace than is used for sintering of the interconnects.

In embodiments, one or more pump-purge steps as described above may be performed to remove background gas, such as nitrogen, out of the processing chamber before performing the sintering step 208. The various structures used to support the interconnects, such as the ceramic tile spacers, may optionally be baked out at high-temperature (e.g., ~1550° C. for 8 hours) to remove any volatile materials that may be present before they are used in the sintering step 208. In both the debinding 206 and sintering 208 steps, the sub-atmospheric pressure in the processing chamber promotes thermal uniformity in the interconnects, which enables a larger number of interconnects to be stacked in a column. During the sintering step 208 in a sub-atmospheric environment, at least a portion of the chromium in the interconnect may evaporate and be reincorporated into the interconnect. This may enable the chromium to mix more effectively with the iron in the interconnect to provide a more uniform interconnect composition. The sub-atmospheric pressure within the processing chamber may be controlled to provide suitable chromium evaporation and reincorporation. When the pressure within the chamber is too low, the chromium may not effectively reincorporate within the interconnect, but may instead coat the inside of the chamber and/or the container in which the interconnects are contained. When the pressure within the chamber is too high, some of the interconnects, particularly those near the bottom of an interconnect column, may be too cold, which may result in non-uniform chromium reincorporation. The presence of hydrogen gas within the processing chamber may act to suppress chromium evaporation. Thus, both the sub-atmospheric pressure within the processing chamber as well as the gas composition within the chamber may be controlled to promote optimal evaporation/reincorporation of chromium and uniform interconnect composition. In some embodiments, the sintering step 208 may be performed in an environment that is substantially free of hydrogen gas.

Figure 4A:
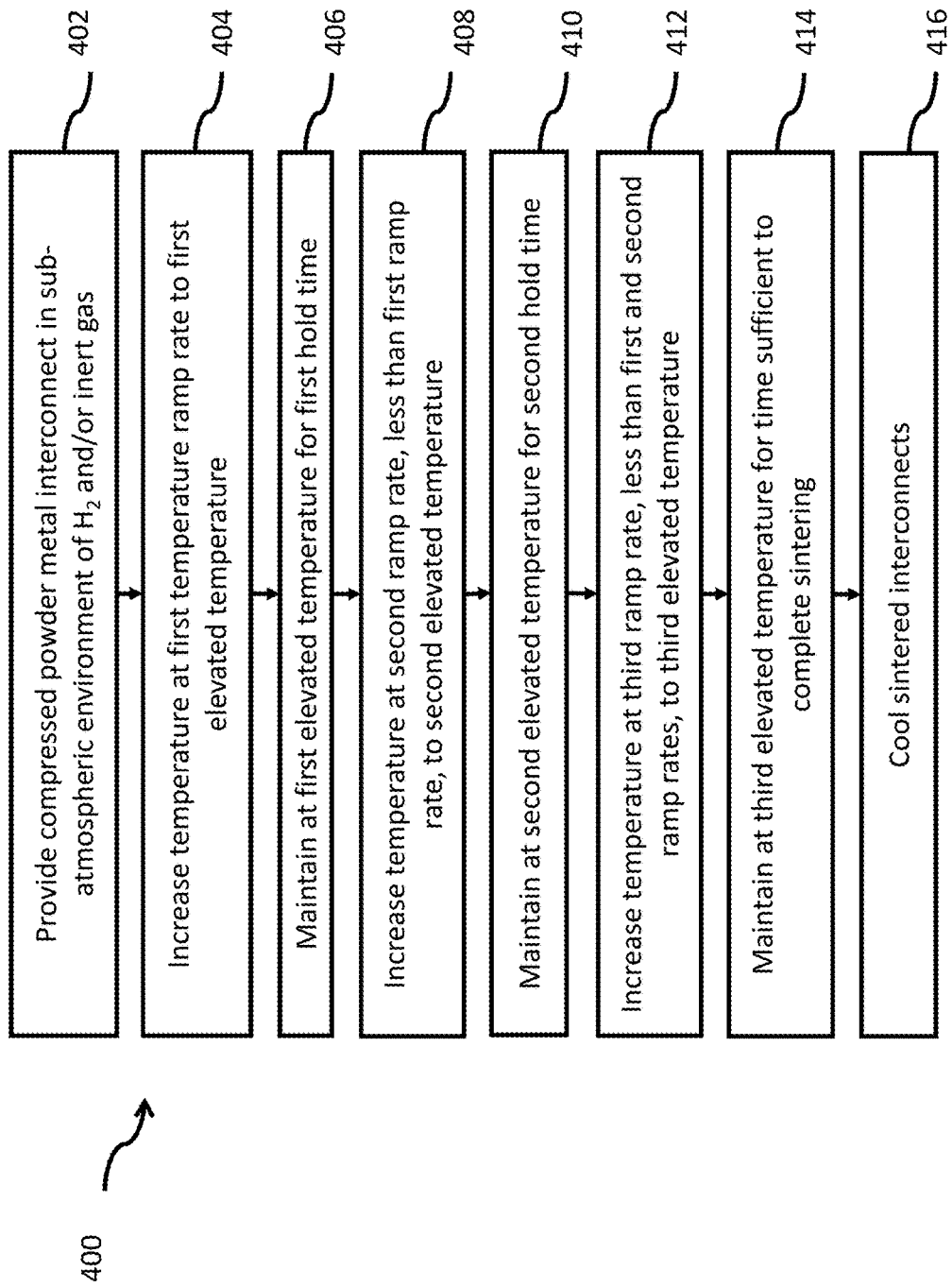
FIG. 4A is a process flow diagram illustrating an embodiment method for sintering an interconnect.
Figure 4B:
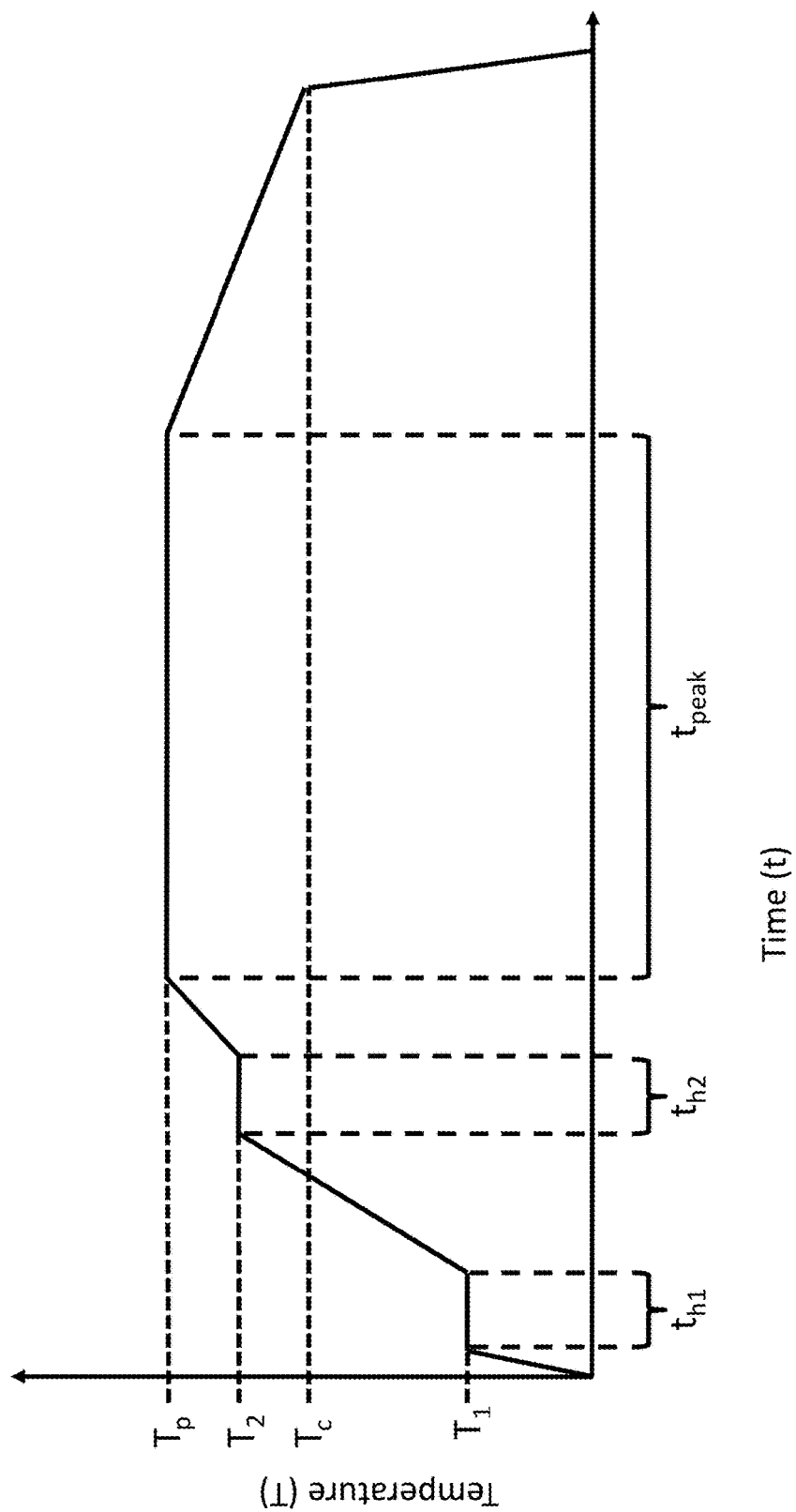
FIG. 4B is a plot schematically illustrating the temperature as a function of time during one embodiment method for sintering an interconnect.

FIG. 4A is a process flow diagram illustrating a method 400 for sintering a compressed powder metal interconnect according to one embodiment. FIG. 4B is a plot schematically illustrating the temperature as a function of time during one embodiment method for sintering an interconnect. In step 402 of method 400, one or more compressed powder metal interconnects are provided in a sub-atmospheric environment of hydrogen gas, an inert gas, such as argon, or a mixture of hydrogen gas and inert gas. The one or more compressed powder metal interconnects may be provided in a processing chamber, and the same processing chamber may be utilized to perform additional processing steps, such as the debinding step described above in connection with method 200. The processing chamber may be, for example, a vacuum furnace, and may be operable to control the conditions within the chamber, including at least the pressure, gas composition and temperature within the processing chamber.

In embodiments, the sintering of compressed powder metal interconnects may redistribute the constituent metals (e.g., Fe and Cr) to be relatively well-mixed, as well as provide mechanical integrity to the interconnect. Without wishing to be bound by theory, it is believed that redistribution occurs due to interatomic diffusion driven by concentration gradients where the Fe and Cr touch, and it is driven by evaporation and redeposition by Cr. Hydrogen gas is typically used during sintering because it is a non-oxidizing gas that is relatively inexpensive. Hydrogen also has the capability of reducing oxides on the surface of the particles to make sintering faster. Argon also has some chemical reduction capability, and may also be used. It is also possible to sinter (redistribute the Fe and provide mechanical integrity) in vacuum, in the absence of hydrogen. A vacuum environment also provides some chemical reduction capability.

Thus, in various embodiments, the environment for sintering of the interconnects may be, for example, pure Ar (or other inert gas such as He, Ne, etc.), a mix of Ar (or other inert gas) with hydrogen, or hydrogen. For any of these, the pressure may be 760 Torr (1 atm) or less than 760 Torr (1 atm), such as 100-700 Torr, for example, 200-600 Torr, including 250-500 Torr. Alternatively, a vacuum or near vacuum may be used, such as a pressure in the $10^{-3}$ to $10^{-6}$ Torr range. Generally, some atmosphere may be desirable during sintering to suppress evaporation of Cr and redeposition on the walls of the chamber.

In step 402, the temperature of the at least one interconnect is increased at a first temperature ramp rate to a first elevated temperature ($T_1$ in FIG. 4B). The temperature may be increased by controlling the processing chamber to increase the temperature inside the chamber. The first elevated temperature is generally less than the peak sintering temperature, and may be, for example, between about 250° C. and about 500° C. In one embodiment, the first elevated temperature may be between about 300° C. and about 350° C., such as about 315° C. The first temperature ramp rate may be a relatively fast ramp rate, and may be greater than about 250° C. per hour. In one embodiment, the first (or "fast") temperature ramp rate may be between about 550° C./hr and about 800° C./hr, such as between about 600° C./hr and about 700° C./hr, and may be about 650° C./hr. The chamber may be maintained at the first elevated temperature for a first hold time in step 404 to establish uniform heating of the interconnect(s). The first hold time ($t_{h1}$ in FIG. 4B) may be between about 0.5 and about 2 hours, such as about 1 hour.

Following the first hold time, the temperature is increased at a second ramp rate to a second elevated temperature ($T_2$ in FIG. 4B) in step 408. The temperature may be increased by controlling the processing chamber to increase the temperature inside the chamber. In the embodiment of FIG. 4, the second elevated temperature is less than the peak sintering temperature, and may be, for example, between about 900° C. and about 1300° C. In one embodiment, the second elevated temperature may be between about 1150° C. and about 1300° C., such as about 1230° C. In other embodiments, the temperature may be increased at the second ramp rate directly to the peak sintering temperature, which may be between about 1300° C. and about 1550° C.

The second temperature ramp rate is less than the first ramp rate, and may be less than about 250° C. per hour. In one embodiment, the second (or "medium") temperature ramp rate may be between about 150° C./hr and about 250° C./hr, such as about 200° C./hr. The chamber may be maintained at the second elevated temperature for a second hold time in step 410 to establish uniform heating of the interconnect(s). The second hold time ($t_{h2}$ in FIG. 4B) may be between about 0.5 and about 2 hours, such as about 1 hour.

Following the second hold time, the temperature is increased at a third ramp rate to a third elevated temperature in step 412. The temperature may be increased by controlling the processing chamber to increase the temperature inside the chamber. In the embodiment of FIG. 4, the third elevated temperature a peak sintering temperature ($T_p$ in FIG. 4B), and may be, for example, between about 1300° C. and about 1550° C., such as about 1400° C. In other embodiments, the temperature may be increased in stages to one or more additional hold temperatures until the peak sintering temperature is reached.

The third temperature ramp rate is less than the first and second ramp rates, and may be less than about 200° C. per hour. In one embodiment, the third (or "slow") temperature ramp rate may be between about 100° C./hr and about 200° C./hr, such as about 150° C./hr. In step 414, the chamber may be maintained at the peak sintering temperature for a desired peak sintering temperature duration ($t_{peak}$ in FIG. 4B), which is typically between about 15 minutes to about 18 hours, e.g., 5-10 hours. The peak sintering temperature duration may be selected to tailor the properties of the interconnects, such as CTE and magnetic response of the interconnects. This allows for manipulating the stress state of the electrolyte in stack processing and helps reduce cell breakage.

Following the completion of the sintering, the interconnect(s) may be cooled by decreasing the temperature in step 416. In one embodiment, the temperature within the processing chamber may be decreased at a cool-down rate from the peak sintering temperature to a lower temperature ($T_c$ in FIG. 4B). In some embodiments, the lower temperature may be less than 1000° C., such as between 800° C. and 850° C. The cool-down rate may be less than about 100° C. per hour, such as about 50° C./hr. The interconnects may then be quenched to a temperature below about 65° C., such as room temperature.

Interconnects produced by the present sintering method as described above exhibit improved uniformity in the interdiffusion of the constituent metals, such as Cr and Fe. FIGS. 5A-5D are energy-dispersive x-ray spectroscopy (EDS) maps illustrating the respective concentrations of chromium and iron in an interconnect fabricated by the comparison example method described above (FIGS. 5A-5B) and in an interconnect fabricated by an embodiment method 400 (FIGS. 5C-5D). Differences in the sintering process between the "comparison example" of FIGS. 5A-5B and the "embodiment method 400" of FIGS. 5C-5D are summarized in Table 1, below:

TABLE 1

Figure 5A:
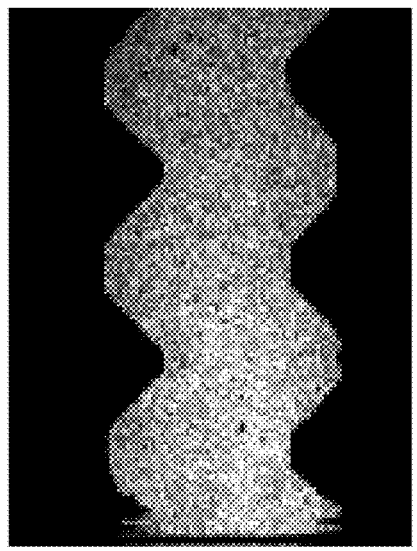
FIGS. 5A-5D are energy-dispersive x-ray spectroscopy (EDS) maps illustrating the concentrations of chromium and iron in an interconnect fabricated by a conventional method (FIGS. 5A-5B) and in an interconnect fabricated by an embodiment method (FIGS. 5C-5D).
Figure 5C:
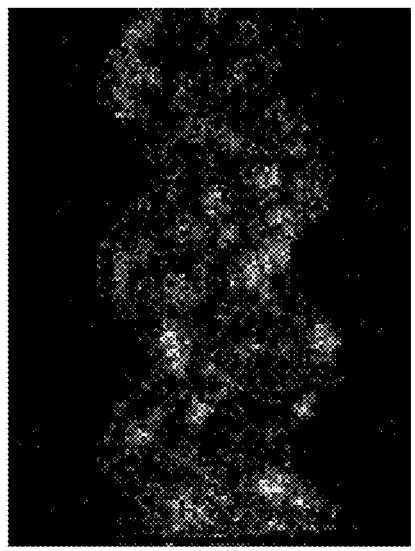
Figure 5B:
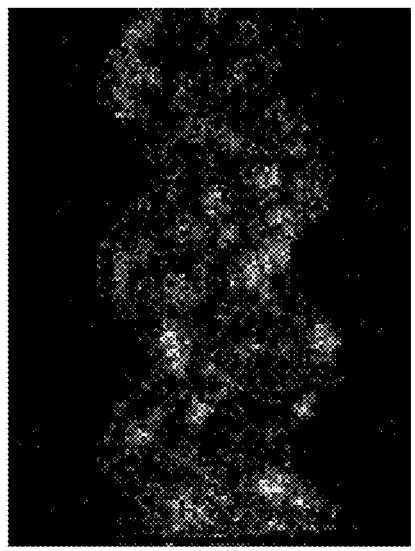
Figure 5D:
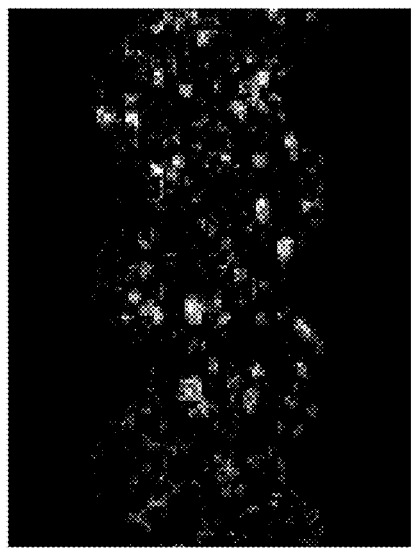

|  | "Comparison example" of sintering IC in FIGS. 5A-5B | "Embodiment method 400" of sintering IC in FIGS. 5C-5D |
|---|---|---|
| Peak Temperature | Between $T_2$ and $T_p$ in FIG. 4B. | $T_p$ in FIG. 4B |
| CTE | 1.2% lower | Baseline/optimum |
| Fe diffusion in Cr matrix | Less | More |
| Sintering atmosphere | Hydrogen at atmospheric pressure | Argon at subatmospheric pressure |
| IC stacking during sintering | Ceramic spacer plate located between each two adjacent ICs in the stack of ICs | Ceramic spacers used, but not between each two adjacent ICs in the stack of ICs, allowing IC to IC contact in the stack and less spacers in the column of ICs |
| Furnace type | Non-vacuum | Vacuum |

As can be seen most clearly in the comparison of the Fe concentrations in an interconnect produced using the comparison example method (FIG. 5B) and an interconnect produced using an embodiment method 400 (FIG. 5D), in the interconnect of FIG. 5B, the Fe particles are more tightly clumped, whereas in the interconnect of FIG. 5D, which was produced in accordance with an embodiment method 400, the Fe is dispersed much more evenly throughout the Cr matrix of the interconnect. This helps provide a more uniform coefficient of thermal expansion (CTE) for the interconnect, which results in improved stability when the interconnects are incorporated into a high-temperature fuel cell stack. The interconnect depicted in FIGS. 5A and 5B has been sintered enough to debind the organic materials, but not enough to promote sufficient interdiffusion of Fe and Cr. The peak temperature during sintering of this example is between $T_2$ and $T_p$ in FIG. 4B. The interconnect depicted in FIGS. 5C and 5D has been sintered at sufficiently high temperature to promote greater interdiffusion of Fe and Cr. The peak temperature during sintering of this example was $T_p$ in FIG. 4B. The CTE of the interconnect may be a useful measure of the overall (macroscopic) Fe/Cr interdiffusion, since Cr has a lower CTE than Fe, and as Fe segregates, the properties of the matrix are closer to pure Cr and the CTE therefore decreases. In the comparison shown in FIGS. 5A-5D, the interconnect produced by the embodiment sintering method (FIGS. 5C and 5D) had a CTE that was 1.2% higher than the CTE of the interconnect produced by the comparison example method (FIGS. 5A and 5B).

Various embodiments include methods for performing controlled oxidation of an interconnect for a fuel cell stack. Damage to the cells in a fuel cell stack can be reduced or prevented by exposing the interconnects to an oxidizing ambient, such as air at high temperature, prior to use of the interconnect in the stack. The high temperature air exposure causes oxide formation and the associated geometric distortion of the interconnects prior to the attachment of the seals and the interconnect to the cells, such as to the electrolyte and/or the electrodes of the cells. The oxidation fills the pores throughout the thickness of the relatively porous powder pressed interconnect, causing a slight change in length and width (e.g., 0.1-0.5%) of the interconnect. During subsequent heat-ups, e.g., during use of the stack, less (or negligible) distortion due to oxidation occurs and the stresses on the cells are greatly reduced compared to stacks containing non-preoxidized interconnects.

The oxide (e.g., $Cr_2O_3$) is formed by oxidizing the sintered Cr—Fe interconnects in air. However, it has been observed that Chromium Nitride (CrN) also forms during the oxidation of sintered Cr—Fe interconnects. These nitrides can block the pores and inhibit uniform oxide formation throughout the thickness of the interconnect. It is desirable to reduce or eliminate CrN from oxidized interconnects, since this may adversely affect the performance of the fuel cell stack.

Figure 6:
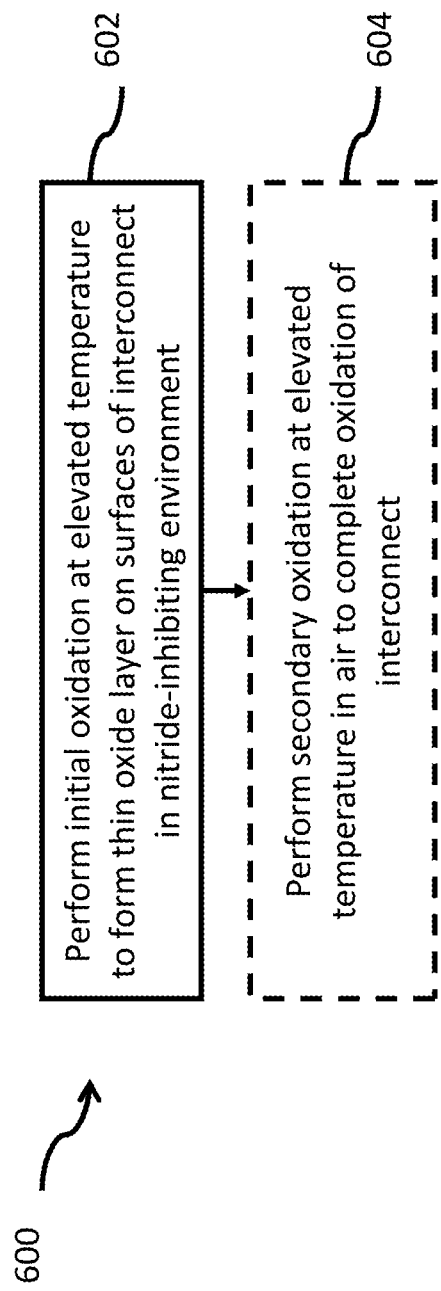
FIG. 6 is a process flow diagram illustrating an embodiment method for oxidizing an interconnect.

FIG. 6 is a process flow diagram illustrating a method 600 for oxidizing an interconnect according to one embodiment. In step 602 of method 600, an initial oxidation is performed at elevated temperature to form a thin oxide layer on surfaces of interconnect, including on the surfaces of pores, interconnected pores and the outer surfaces of the interconnect, in a nitride-inhibiting environment. In optional step 604, a secondary oxidation is performed at elevated temperature to complete the oxidation process. The secondary oxidation may be performed in air or in a nitride-inhibiting environment. The thin oxide layer formed during the initial oxidation prevents nitrides from forming on the interconnect during the secondary oxidation.

Figure 7C:
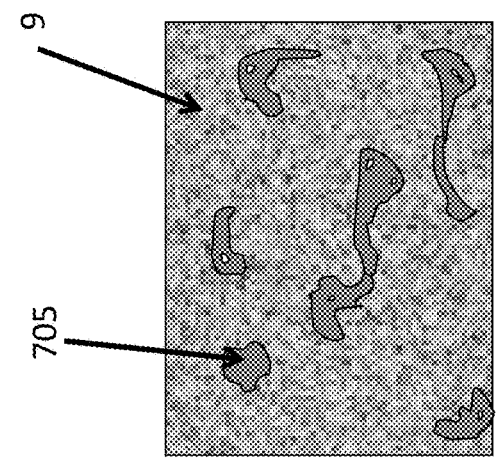
FIGS. 7A-7C schematically illustrate an interconnect as sintered (FIG. 7A), after an initial oxidation in a nitride-inhibiting environment (FIG. 7B), and after a secondary oxidation (FIG. 7C).
Figure 7B:
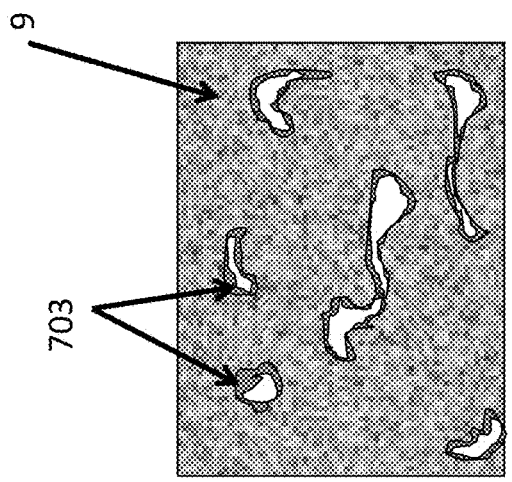
Figure 7A:
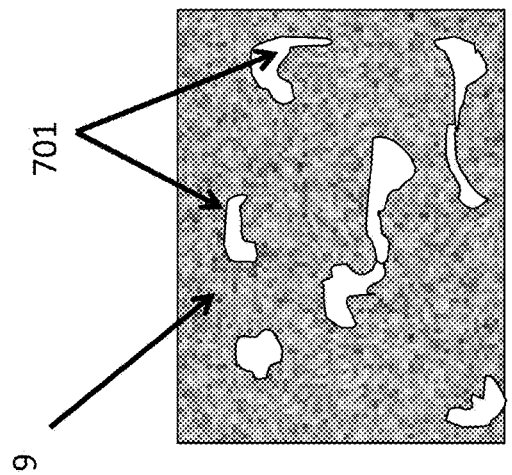

FIG. 7A is a schematic magnified view of a portion of a sintered fuel cell interconnect 9 having a plurality of open pores 701. FIG. 7B shows the interconnect 9 after an initial oxidation treatment in a nitride-inhibiting environment. As can be seen, a thin oxide layer 703 is formed in the pores. There is little or no evidence of nitride formation. FIG. 7C shows the interconnect after a secondary oxidation under "normal" oxidizing conditions—i.e., at 850° C.-1100° C., e.g., 975° C. in air for 12-36 hours, e.g., approx. 24 hours. After this secondary oxidation, the oxide 705 has formed to substantially fill the pores 701, and there is no evidence of nitride formation. In general, following the second oxidation, oxide material covers substantially all of the exposed surfaces of the pores 701, and the pores 701 may be at least about 15% filled with oxide material. For a typical pore size, the oxide material may fill between 15% and 50% of the volume of the pore. For some pores, such as smaller pores, the oxide material may fill 50% or more of the volume of the pore, including 100% of the pore volume. The initial formation of a thin layer of oxides in the pores in a nitride-inhibiting embodiment reduces or eliminates the formation of nitrides when the interconnect is fully oxidized.

In some embodiments, the interconnect may be fully oxidized (e.g., such that pores 701 are substantially fully filled with oxide 705) during an initial oxidation in a nitride-inhibiting environment. In these embodiments, the optional secondary oxidation step is not performed.

In one embodiment, a nitride-inhibiting environment may be provided by decreasing the nitrogen content, or removing nitrogen completely, from the oxidizing gas. In one exemplary embodiment, the interconnects may be oxidized in pure oxygen, or for safety reasons, in a mixture of oxygen and an inert gas, such as argon. A suitable mixture of oxygen and inert gas may include about 10% to about 30% oxygen, and preferably about 20% oxygen, with the balance being an inert gas, such as argon. The oxidizing gas mixture in this embodiment may contain substantially no nitrogen (e.g., no intentionally introduced nitrogen).

In one embodiment, one or more interconnects may undergo an initial oxidization in a mixture of inert gas and oxygen (e.g., an argon-20% oxygen mixture) as described above. The initial oxidation may be performed at an elevated temperature of between about 850° C. and about 1100° C., such as about 975° C. The initial oxidation may be performed for between about 12 and 36 hours, such as about 24 hours. Following the initial oxidation, the one or more interconnects may undergo a secondary oxidation in air at an elevated temperature of between about 850° C. and about 1100° C., such as about 975° C., for 12-24 hours.

In another embodiment, the oxidizing gas may include a mixture of oxygen, an inert gas, and air. For example, a suitable oxidizing gas may include about 50% air and about 50% of an oxygen-inert gas mixture as described above. In this embodiment, the nitrogen content of the oxidizing gas mixture is less than the nitrogen content of air, and in embodiments the nitrogen content of the oxidizing gas mixture may be less than about 50%, such as about 40% or less. The oxygen content of the oxidizing gas mixture may be, for example, between about 10% to about 30%, such as about 20%. The balance may be an inert gas, such as argon. It has been found that the reduced nitrogen content of the oxidizing gas in this embodiment substantially inhibits the formation of nitrides on the interconnects during oxidation.

The one or more interconnects may undergo an initial oxidization in a mixture of inert gas and oxygen (e.g., an argon-20% oxygen mixture) and additionally with air (e.g., approx. 50%) as described above. The initial oxidation may be performed at an elevated temperature of between about 850° C. and about 1100° C., such as about 975° C. The initial oxidation may be performed for between about 12 and 36 hours, such as about 24 hours. Following the initial oxidation, the one or more interconnects may undergo a secondary oxidation in air at an elevated temperature of between about 850° C. and about 1100° C., such as about 975° C., for 12-24 hours.

In one embodiment, a nitride-inhibiting environment may be provided by oxidizing the one or more interconnects at a reduced temperature. The reduced temperature may be a temperature at which oxides form but nitrides do not form. For example, one or more interconnects may undergo an initial oxidation in air at a temperature of between about 700° C. and 800° C., such as about 750° C. At this temperature, a thin oxide layer forms on and within the pores of the interconnect, but nitrides generally do not form on the interconnect. The initial oxidation may be for between about 12 and 36 hours, such as about 24 hours. Following initial oxidation, the one or more interconnects may undergo a secondary oxidation in air at higher temperature of between about 850° C. and about 1100° C., such as about 975° C., for 12-24 hours.

In one embodiment, a nitride-inhibiting environment may be provided by flowing air over the one or more interconnects at an elevated temperature. It has been found that oxides but not nitrides preferentially form in the presence of moving air. Without wishing to be bound by theory, it is believed that the mechanisms of the nitride (e.g., CrN) and oxide (e.g., $Cr_2O_3$) forming reactions are such that nitrides tend to form in "stale" (e.g., non-moving) air, while oxides preferentially form in "fresh" (e.g., moving) air. It has been found that nitride formation is substantially inhibited in flowing or moving air.

In one embodiment, one or more interconnects may undergo an initial oxidization in air at a temperature of between about 850° C. and about 1100° C., such as about 975° C., for about 12 hours. During the initial oxidation, the oxidizing air may be flowed over the interconnect(s) at a rate of between about 25 and 100 standard cubic feet per hour (SCFH), such as about 50 SCFH. Following initial oxidation, the one or more interconnects may undergo a secondary oxidation in stationary or flowing air at higher temperature of between about 850° C. and about 1100° C., such as about 975° C., for 12-24 hours.

In further embodiments, a nitride-inhibiting environment may be provided by providing one or more interconnects in the oxidizing environment with access to "fresh" or moving oxidizing gas (e.g., air) during the oxidation process. For example, the one or more interconnects may be hung within the processing chamber in which the oxidation process takes place. By hanging the interconnects, as opposed to stacking the interconnects as is typically done, the interconnects have access to "fresh" or moving air during the oxidation process. In this way, an oxide layer may be formed on and within the pores of the interconnects, while nitride formation is substantially inhibited. In some embodiments, the air may be circulated or flowed over the interconnects, e.g., by a fan or blower, while in other embodiments, the natural movement of air within the processing chamber may be sufficient to inhibit nitride formation. In this embodiment, the oxidation process may occur in a single step, and there may be no need for separate initial and secondary oxidation steps.

Figure 8:
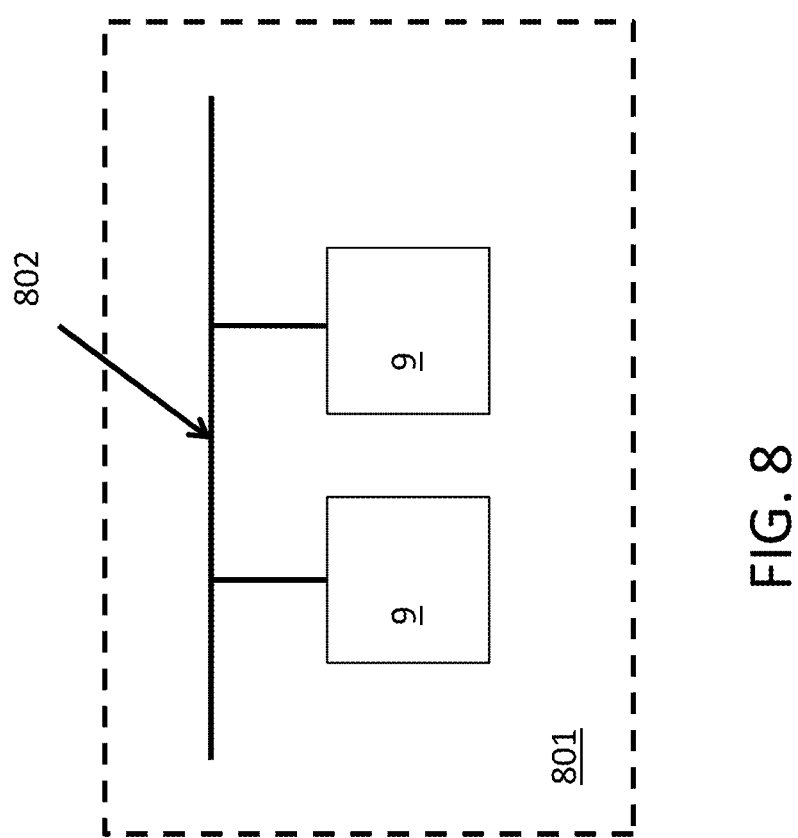
FIG. 8 schematically illustrates a support apparatus for hanging interconnects within a processing chamber for oxidizing the interconnects.

In one example embodiment, one or more interconnects may undergo oxidization in air at a temperature of between about 850° C. and about 1100° C., such as about 975° C., for about 12-36 hours, such as 24 hours. During the oxidation process, the interconnects may be hung within the processing chamber to provide the interconnects access to moving air. FIG. 8 illustrates one embodiment in which a plurality of interconnects 9 are hung by their edges by a suitable support apparatus 802, which may be similar to a clothes line for drying clothes, within the processing chamber 801. Nitride formation may be substantially inhibited.

Figure 9B:
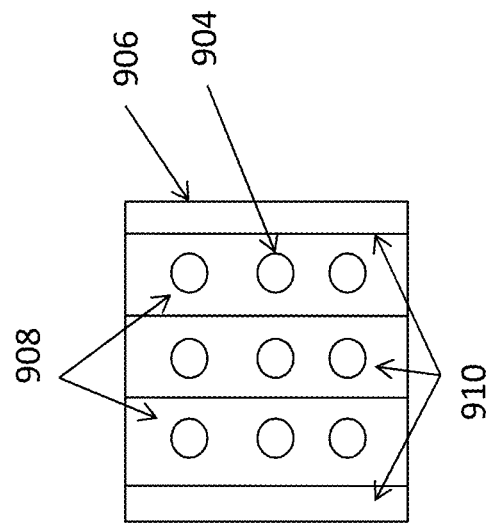
FIG. 9B is a top view of a ceramic tile spacer having ridges defining grooves between the ridges to allow fresh air to flow and interact with an interconnect adjacent the spacer.
Figure 9A:
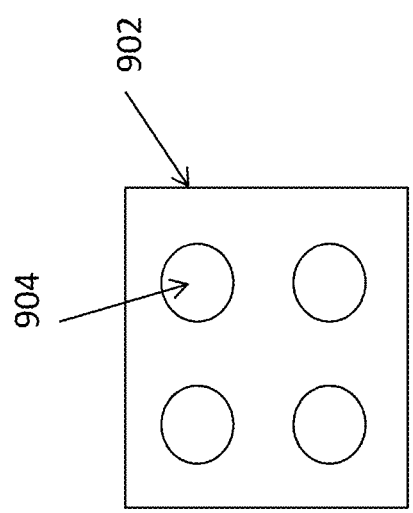
FIG. 9A is a top view of a ceramic tile spacer having openings provided through the spacer to allow fresh air to interact with an interconnect adjacent the spacer.
Figure 9C:
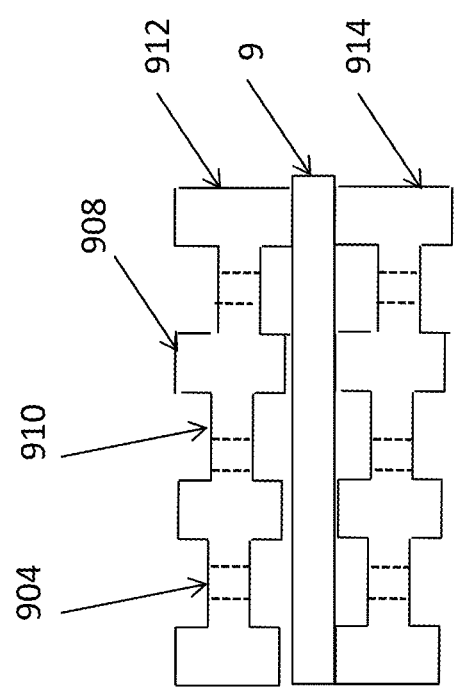
FIG. 9C is a side view of an interconnect positioned between a pair of ceramic tile spacers having ridges defining grooves and openings to allow fresh air to flow and interact with the interconnect.

Instead of hanging the interconnects, the interconnects may be provided with access to moving air through other means, such as by providing the interconnects on porous or grooved supports. For example, a plurality of interconnects may be stacked to form one or more columns. The interconnects in a column may be interleaved with spacers, such as ceramic tiles, which may be formed with openings or grooves to allow fresh air to flow and interact with the interconnects. FIG. 9A is a top view of a ceramic tile spacer 902 having openings 904 formed through the spacer 902 to allow fresh air to interact with the interconnects. FIG. 9B is a top view of a ceramic tile spacer 906 having ridges 908 defining grooves 910 between the ridges 908 to allow fresh air to flow and interact with the interconnects. The spacer 906 may optionally also include openings 904 through the spacer 906. FIG. 9C is a side view of an interconnect 9 positioned between a pair of ceramic tile spacers 912, 914. Each of the spacers 912, 914 include ridges 908 and grooves 910 in addition to openings 904 to permit fresh air to interact with the interconnect 9.

While solid oxide fuel cell interconnects, end plates, and electrolytes were described above in various embodiments, embodiments can include any other fuel cell interconnects, such as molten carbonate or PEM fuel cell interconnects, or any other metal alloy or compacted metal powder or ceramic objects not associated with fuel cell systems.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of oxidizing an interconnect for a fuel cell stack, comprising:
   subjecting the interconnect to an initial oxidation treatment at a first temperature in a nitride-inhibiting environment comprising at least 10% oxygen, to form a first oxide layer on at least a surface of the interconnect, the interconnect comprising more than 90% chromium and less than 10% iron; and
   subjecting the interconnect to a secondary oxidation treatment, in air, and at a second temperature of between about 850° C. and about 1100° C., to cover surfaces of exposed pores of the interconnect with a second oxide layer, such that the exposed pores are at least 15% filled with oxide material.

2. The method of claim 1, wherein the initial oxidation treatment is performed in pure oxygen.

3. The method of claim 1, wherein the first temperature is between about 850° C. and 1100° C.

4. The method of claim 1, wherein the nitride-inhibiting environment is provided by providing an oxidizing gas that contains no intentionally introduced nitrogen.

5. The method of claim 4, wherein the oxidizing gas comprises a mixture of oxygen and an inert gas.

6. The method of claim 1, wherein the nitride-inhibiting environment is provided by providing an oxidizing gas that is less than about 50% nitrogen.

7. The method of claim 6, wherein the oxidizing gas comprises a mixture of air and one or more of oxygen and an inert gas.

8. The method of claim 1, wherein the nitride-inhibiting environment is provided by maintaining the interconnect at a first temperature at which nitrides do not form on the interconnect during the initial oxidation treatment.

9. The method of claim 8, wherein the first temperature is maintained between about 700° C. and 800° C.

10. The method of claim 9, wherein the first temperature is maintained at about 750° C.

11. The method of claim 1, wherein the nitride-inhibiting environment inhibits the growth of chromium nitride on a surface of the interconnect.

12. The method of claim 1, wherein the first oxide layer comprises a chromium oxide material.

13. The method of claim 1, wherein the interconnect comprises at least 95% chromium and 4-5% iron.

14. A method of oxidizing an interconnect for a fuel cell stack, comprising:
    subjecting the interconnect to an oxidation treatment at a first temperature in a nitride-inhibiting environment comprising at least 10% oxygen, to form a first oxide layer on at least a surface of the interconnect, the interconnect comprising more than 90% chromium and less than 10% iron,
    wherein the nitride-inhibiting environment is provided by flowing oxidizing gas over the interconnect during the initial oxidation treatment.

15. The method of claim 14, further comprising subjecting the interconnect to a secondary oxidation treatment, in air, and at a second temperature between about 850° C. and about 1100° C. to cover surfaces of exposed pores of the interconnect with a second oxide layer, such that the exposed pores are at least 15% filled with oxide material.

16. The method of claim 15, wherein the interconnect is hung within a processing chamber to provide the interconnect with access to the flowing oxidizing gas.

17. The method of claim 15, wherein the interconnect is provided on or in contact with a porous or grooved support to provide the interconnect with access to moving oxidizing gas.

18. The method of claim 15, wherein the nitride-inhibiting environment comprises pure oxygen.

* * * * *